United States Patent [19]
Jones, Jr. et al.

[11] Patent Number: 5,462,139
[45] Date of Patent: Oct. 31, 1995

[54] CAST BOLT-ON MOUNTING BRACKET FOR SUPPORTING A DISC BRAKE ON A RAILCAR TRUCK

[75] Inventors: William C. Jones, Jr., Reynoldsburg; Richard B. Polley, Gahanna; Roger F. Sanzo, Columbus, all of Ohio

[73] Assignee: GSI Engineering, Inc., Columbus, Ohio

[21] Appl. No.: 237,651

[22] Filed: May 4, 1994

[51] Int. Cl.⁶ ..................................... F16D 65/14
[52] U.S. Cl. ........................... 188/206 R; 188/59
[58] Field of Search ................... 188/59, 205 R, 188/206 R, 209

[56] References Cited

U.S. PATENT DOCUMENTS

| | | | |
|---|---|---|---|
| 2,873,004 | 2/1959 | Polanin | 188/205 R X |
| 3,027,976 | 4/1962 | Soddy | 188/59 |
| 3,034,599 | 5/1962 | Gaenssle | 188/206 R X |
| 3,307,659 | 3/1967 | Goods | 188/59 |

*Primary Examiner*—Robert J. Oberleitner
*Assistant Examiner*—Kevin D. Rutherford
*Attorney, Agent, or Firm*—Banner & Allegretti, Ltd.

[57] ABSTRACT

An improved mounting bracket for supporting a disc brake actuator assembly on a railcar truck, the mounting bracket being a cast metal bracket designed to bolt onto a portion of the truck frame, the bracket being generally H-shaped in cross section along a major portion of its length with the "H" being generally disposed horizontally so that the two sides of the H comprise upper and lower substantially solid horizontal walls.

7 Claims, 3 Drawing Sheets

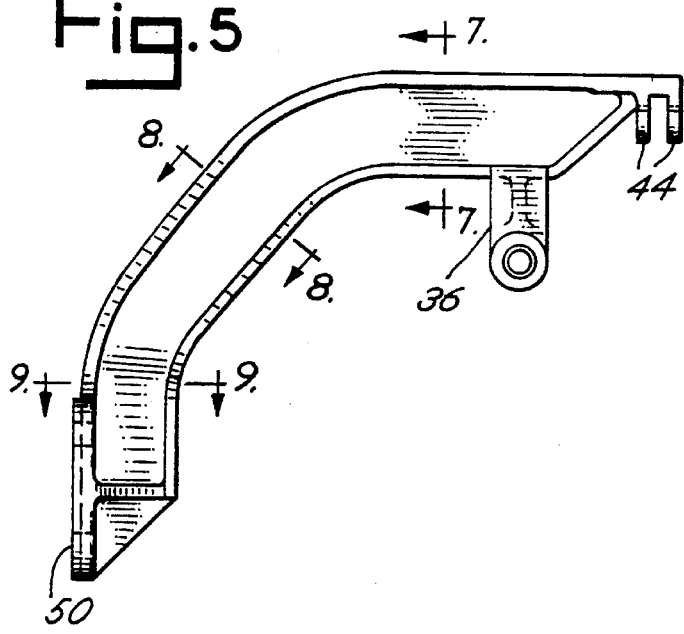
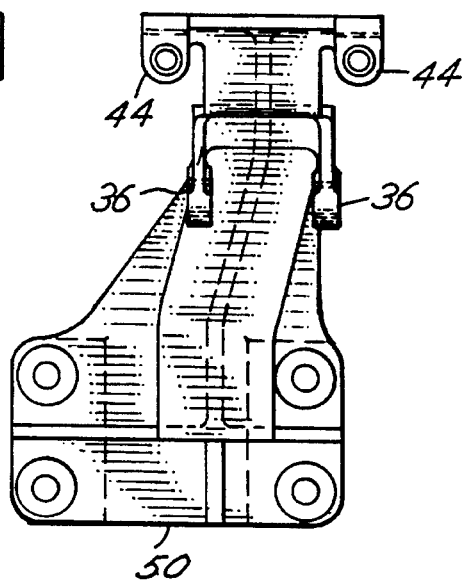
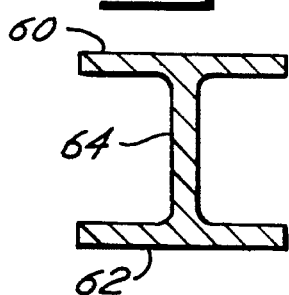
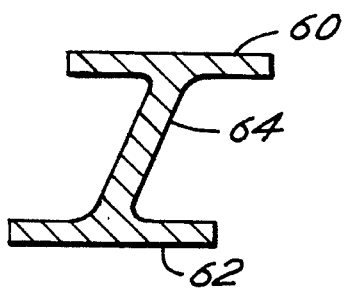
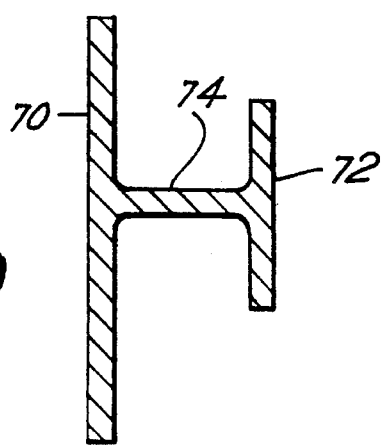

is a top plan view showing a conventional railcar truck equipped with bolt-on cast mounting brackets 8 in accordance with the present invention. The truck assembly includes a pair of side frames 10 and 12, a truck bolster 14, a pair of axles 16 and 18, four rail wheels 20, and four disc members 22, there being a pair of discs fixedly mounted on each of the axles for cooperation with brake shoes as is known in the art.

CAST BOLT-ON MOUNTING BRACKET FOR SUPPORTING A DISC BRAKE ON A RAILCAR TRUCK

BACKGROUND OF THE INVENTION

1. Field of the Invention

The present invention relates to a freight car truck and in particular to a cast bracket for supporting a disc brake assembly for such a truck from a transom of a frame casting comprising a part of the freight car truck.

The invention pertains generally to a mounting bracket for a 4-wheel freight car truck. Typically, such a truck will have four disc brakes associated with the four rail wheels of the truck. Such a truck may also be equipped with four tread brakes which are also associated with the four rail wheels. However, the mounting bracket of the present invention is intended for mounting of the disc brakes.

It is well known in the art to provide a mounting bracket for supporting a disc brake assembly from a transom which comprises part of the truck frame casting. It is also known to bolt such a bracket to the transom as is done in the case of the present invention. However, such mounting brackets are typically fabricated in a manner where several parts are welded together. Such fabricated mounting brackets have encountered problems because the various welds comprise weakened sections which require stress risers to reinforce the weakened areas. It was not feasible with such fabricated brackets to locate the welds in areas of low stress concentration.

SUMMARY OF THE INVENTION

The present invention comprises a cast bracket which is designed to bolt on to the transom of the truck frame casting as in the manner of the known fabricated mounting brackets. However, because of the fact that the mounting bracket of the present invention is cast rather than fabricated from welded components, and because of the design of the cast bracket, including its cross-sectional configuration, it has been possible to reduce the weight of the bracket and also to reduce its cost.

Typically, the known fabricated mounting bracket weighs approximately 220 pounds, whereas a mounting bracket cast in accordance with the present invention weighs only approximately 130 pounds. As a result, if four such brackets are provided per freight car truck, the weight of the truck is reduced by 360 pounds which is a significant advantage. Surprisingly, it was discovered that the present invention significantly reduces the cost of the mounting bracket. It will also permit certain manufacturers to produce the brackets in-house rather than obtain it from outside fabricators.

In accordance with a preferred embodiment of the present invention, the bolt-on cast mounting bracket is designed with a generally H-shaped cross section with the "H" oriented horizontally. However, other cross sections may be utilized, including a cast box-shaped cross section.

The foregoing objects and advantages of the invention will be apparent from the following description of certain preferred embodiments, taken in conjunction with the accompanying drawings.

DESCRIPTION OF THE DRAWINGS

FIG. 5 is a detail side elevational view of the bolt-on cast mounting bracket of the present invention;

FIG. 6 is an end elevational view of the mounting bracket of FIG. 5; and

FIGS. 7–9 are cross-sectional views taken along the lines indicated in FIG. 5.

Now, in order to acquaint those skilled in the art with the manner of making and using the invention, there will be described below, in conjunction with the accompanying drawings, certain preferred embodiments of the invention.

DETAILED DESCRIPTION OF THE INVENTION

Figure 2:
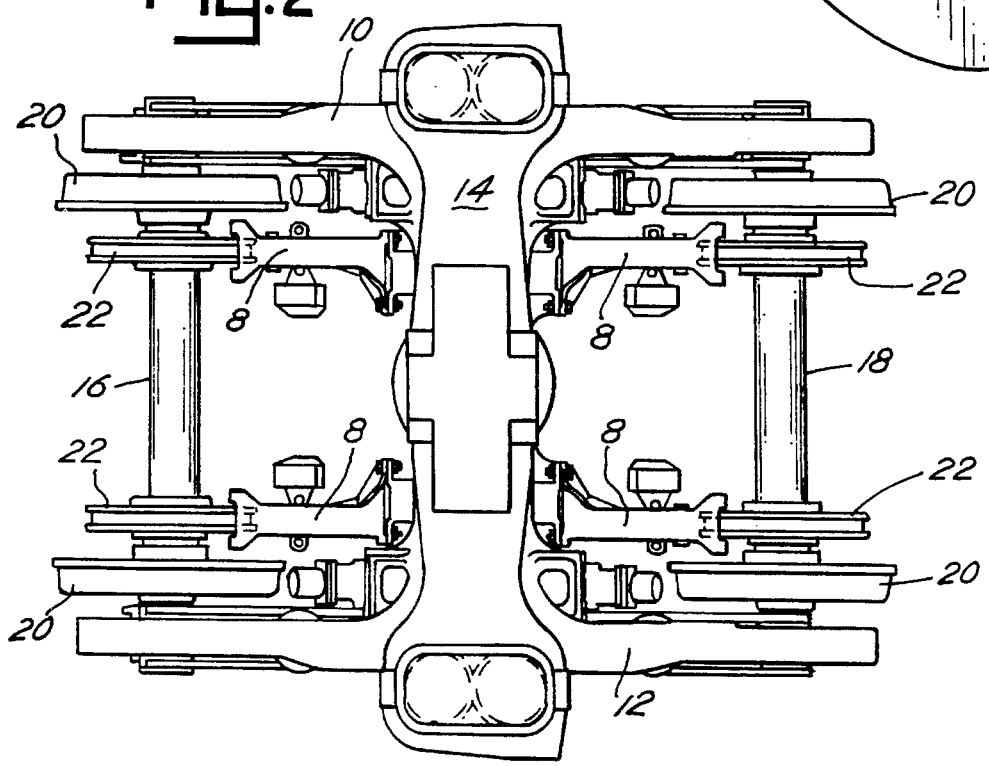
FIG. 2 is a top plan view of a railcar truck assembly equipped with four bolt-on cast mounting brackets in accordance with the present invention.

FIG. 2 is a top plan view showing a conventional railcar truck equipped with bolt-on cast mounting brackets 8 in accordance with the present invention. The truck assembly includes a pair of side frames 10 and 12, a truck bolster 14, a pair of axles 16 and 18, four rail wheels 20, and four disc members 22, there being a pair of discs fixedly mounted on each of the axles for cooperation with brake shoes as is known in the art.

Figure 1:
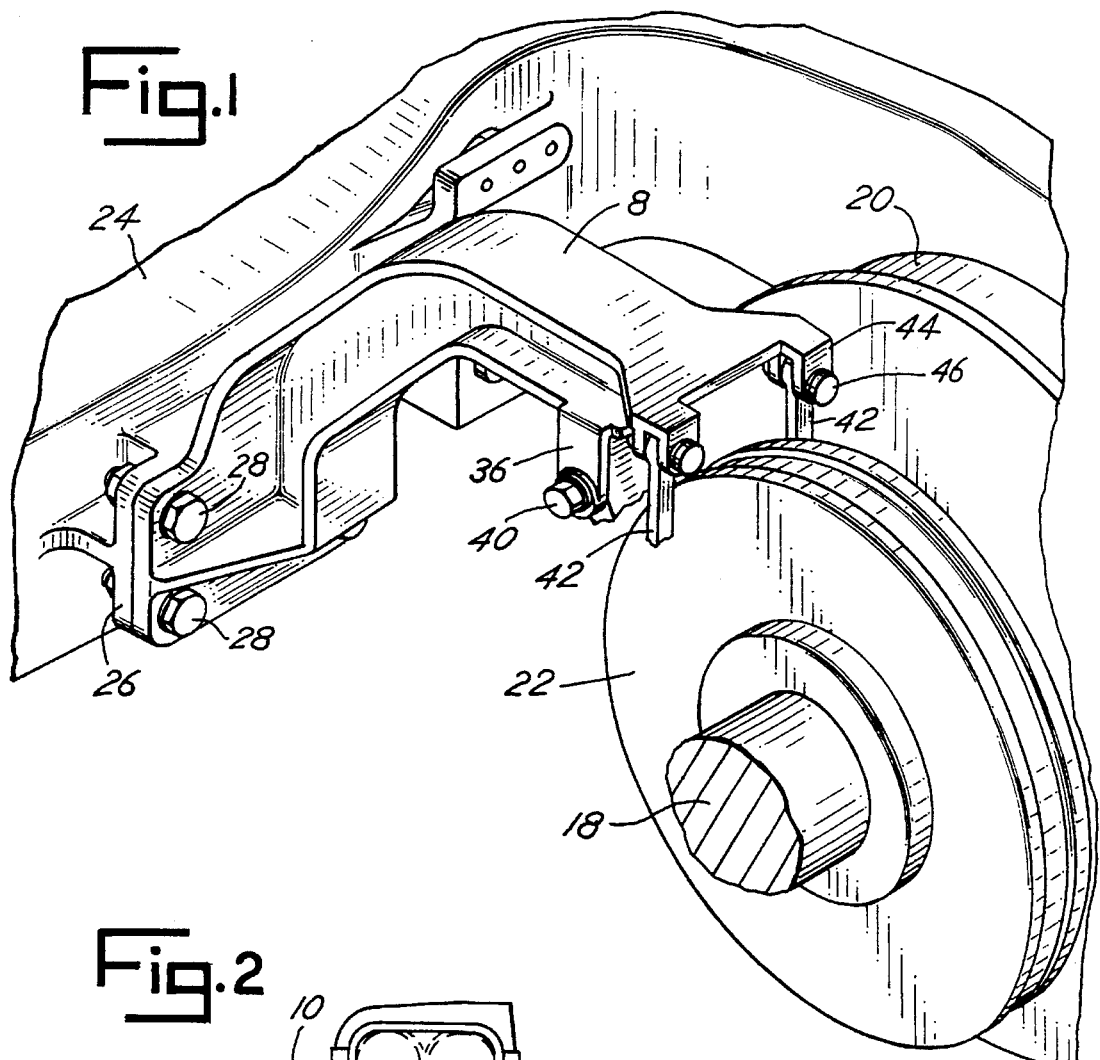
FIG. 1 is a fragmentary perspective view showing a bolt-on cast mounting bracket bolted at one end to the transom portion of a truck frame casting and intended to support at its opposite end a disc brake assembly (not shown), and further showing a disc mounted on a rail wheel axle for conjoint rotation therewith.

FIG. 1 shows one of the bolt-on cast mounting brackets in more detail. The mounting bracket 8 is bolted to a transom portion 24 of a railcar truck frame casting. The transom portion 24 includes a flat mounting surface 26, and four bolts 28 are used to attach the bracket 8 to the mounting surface 26.

It would be possible to cast the mounting bracket 8 integral with the transom portion 24 of the truck frame casting. However, it is preferable to utilize a bolt-on mounting bracket to achieve accuracy in the location of the various lugs at the opposite end of the mounting bracket which serve to support the disc brake actuator assembly.

Figure 3:
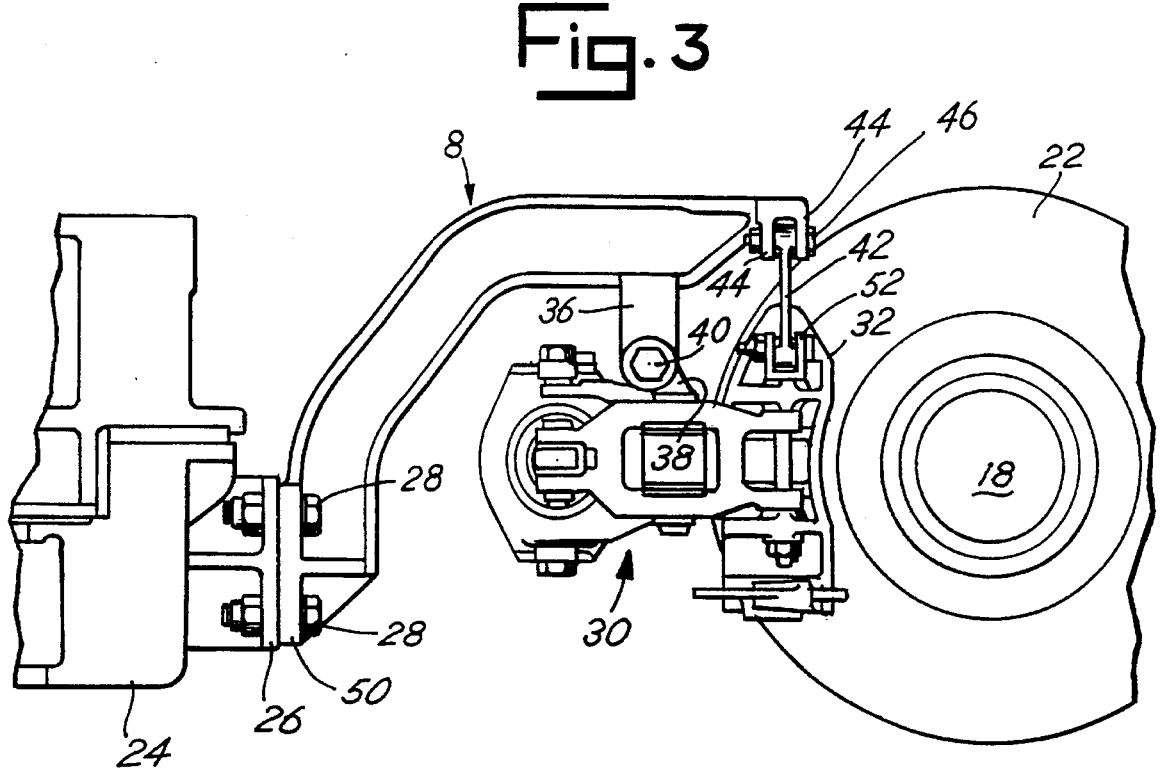
FIG. 3 is a fragmentary side elevational view showing a bolt-on cast mounting bracket in accordance with the present invention having its left-hand end bolted to the transom portion of a truck frame casting and showing at its right hand end various lugs for supporting a disc brake actuator assembly.

FIG. 3 is a side elevational view which illustrates two of the four bolts 28 and which shows the disc brake actuator assembly 30. Because the brake shoe actuator assembly 30 is known in the art, it will not be described in detail. However, it should be understood that the actuator assembly includes a pair of brake shoes 32 which are positioned on opposite sides of a disc 22 and are actuated by a pneumatic cylinder to press against opposite sides of the disc 22 to effect braking of the rail wheels 20.

Still referring to FIG. 3, the outer end of the mounting bracket 8 includes a pair of depending lugs 36 which support an arm 38 which is integral with the actuator assembly for purposes of supporting the actuator assembly 30. A pin 40 extends through the lugs 36 and the arm 38 to effect such support.

The weight of the actuator assembly 30 is supported by the two lugs 36 which depend from the outer end of the mounting bracket 8. As is known in the art, the two lugs 36 are located near the center of gravity of the actuator assembly 30 so the weight of the assembly is effectively supported when the brake shoes 32 are not pressing against the opposite sides of a rotating disc 22. However, as shown in FIG. 3, when disc 22 is rotating, as when the railcar truck is moving along a track, engagement of the brake shoes 32 against the opposite side of the disc 22 will produce either an upward force or a downward force at the location of the brake shoes depending upon the direction of rotation of the disc 22.

For the above reasons, a further support arm or dog bone 42 is suspended from an outer end of the mounting bracket 8 and is connected to the outer end of the brake shoe assembly 30 for the purpose of transmitting an upward or downward vertical force from the brake shoes 32 to the outer end of the mounting bracket 8. A pair of such arms 42 are provided, one on each side of the disc 22. FIG. 3 shows the manner in which the arm 42 is connected to the end of the mounting bracket 8 by a pair of spaced lugs 44 and a pin 46. A similar pair of lugs 44 is integral with the end of bracket 8 on the opposite side of the disc 22, and a similar arm 42 on the opposite side of disc 22 is connected between the brake shoe 32 on the other side of the disc 22 and the opposite pair of lugs 44 which are also integral with the end of the mounting bracket 8. The two arms 42 are known in the art as dog bones and their purpose is to transmit upward and downward vertical forces from the brake shoes 32 to the outer end of the mounting bracket 8.

Figure 4:
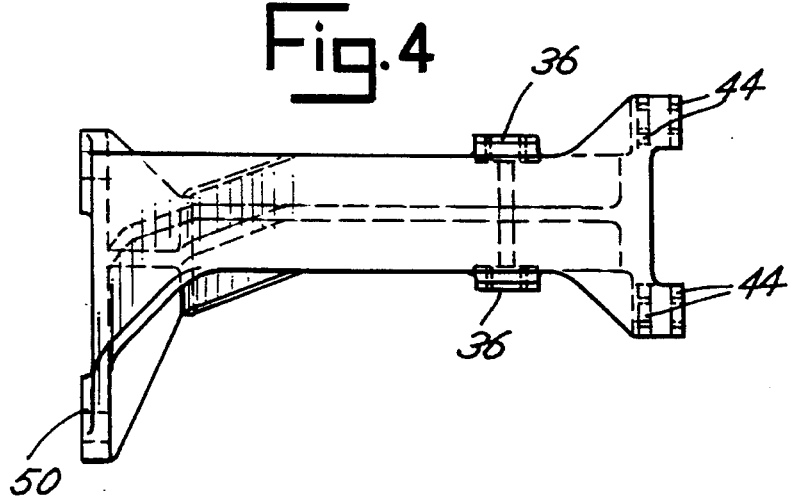
FIG. 4 is a detail top plan view of the bolt-on cast mounting bracket of FIG. 3.

FIG. 4 is a top plan view of the mounting bracket 8 and it shows an end mounting surface 50 which is generally flat and bears against the flat mounting surface 26 shown in FIG. 3. The two depending arms or lugs 36 are shown, as well as the two pairs of spaced lugs 44 to which the two dog bones 42 are connected. The brake shoes 32 include lugs 52 to which the lower end of each dog bone 42 is connected (see FIG. 3).

The bolt-on cast mounting bracket 8 will now be described in more detail. FIG. 5 is a side elevational view of the bracket and FIG. 6 is an end elevational view. FIGS. 7-8 are cross sectional views taken along the lines indicated in FIG. 5 and indicate that the cross-sectional configuration of the bracket 8 is generally H-shaped with the "H" being oriented generally horizontally. Such a cross section comprises an upper horizontal section 60, a lower horizontal section 62, and a central vertical section 64. FIG. 9 is a cross section taken near the inner mounting surface 50 of the bracket 8, and in that area the cross section comprises a relatively wide inner vertical wall 70, a relatively narrow vertical wall 72, and a central horizontal section 74. As the drawings show, the cross section of the cast mounting bracket 8 is generally H-shaped and the "H" is orientated horizontally as shown in FIGS. 7 and 8, except in the area near the inner end of the mounted bracket where it is bolted to the transom 24 as shown by FIG. 9.

As previously indicated, the preferred cross sectional shape of the cast mounting bracket is an H-shape, but other cross sections may be used. One alternative cross section is a box section or square tube which can be cast as is known in the art.

What is claimed is:

1. A mounting bracket assembly for use with a railcar truck for supporting a disc brake actuator assembly from the truck for braking a corresponding rail wheel axle, said disc brake actuator assembly including brake shoes arranged on opposite sides of a brake disc for engagement with a portion of said disc which moves generally upwardly or downwardly depending on the direction of rotation of said disc, said mounting bracket comprising a metal bracket cast as a unitary member and having one end designed to be bolted onto a portion of a truck frame to fix the said bracket in a stationary position relative to said truck frame, and said metal bracket having an opposite end provided with depending lugs for supporting said disc brake actuator assembly, said one end of said metal bracket being generally flat and vertical and provided with bolt holes for bolting to a transom portion of said truck frame.

2. A mounting bracket assembly as defined in claim 1 where said cast metal bracket is generally H-shaped along the major portion of its length, said H-shape being generally disposed horizontally so that the two sides of the "H" comprises upper and lower substantially solid horizontal walls.

3. A mounting bracket assembly as defined in claim 2 where said H-shape is generally disposed in a vertical orientation in an area adjacent to where said bracket is bolted to said truck frame.

4. A mounting bracket assembly as defined in claim 1 where said bracket has a weight in the range of 110 pounds to 150 pounds.

5. A mounting bracket assembly for use with a railcar truck for supporting a disc brake actuator assembly from the truck for braking a corresponding rail wheel axle, said disc brake actuator assembly including brake shoes arranged on opposite sides of a brake disc for engagement with a portion of said disc which moves generally upwardly or downwardly depending on the direction of rotation of said disc, said mounting bracket comprising a metal bracket cast as a unitary member and having one end designed to be bolted onto a portion of a truck frame to fix said bracket in a stationary position relative to said truck frame, and said metal bracket having an opposite end provided with depending lugs for supporting said disc brake actuator assembly, said one end of said metal bracket being generally flat and upright and provided with bolt holes for bolting to a transom portion of said truck frame, said cast metal bracket being generally H-shaped along the major portion of its length, said H-shape being generally disposed horizontally so that the two sides of the "H" comprise upper and lower substantially solid horizontal walls, and said H-shape being generally disposed in a vertical orientation in an area adjacent to where said bracket is bolted to said truck frame.

6. A mounting bracket assembly as defined in claim 5 where said cast metal bracket extends upwardly from said one end and then extends generally longitudinally directly toward a corresponding brake disc.

7. A mounting bracket assembly as defined in claim 5 where said cast metal bracket has a weight in the range of 110 pounds to 150 pounds.

* * * * *